US007151077B2

(12) United States Patent
Prud'homme et al.

(10) Patent No.: US 7,151,077 B2
(45) Date of Patent: Dec. 19, 2006

(54) POLYMERSOME COMPOSITIONS AND ASSOCIATED METHODS OF USE

(75) Inventors: Robert K. Prud'homme, Lawrenceville, NJ (US); Lewis R. Norman, Duncan, OK (US); Douglas H. Adamson, Skillman, NJ (US); Mustafa Erhan Yildiz, Whitehouse Station, NJ (US); Ian D. Robb, Duncan, OK (US)

(73) Assignees: Halliburton Energy Services, Inc., Duncan, OK (US); Princeton University, Princeton, NJ (US)

( * ) Notice: Subject to any disclaimer, the term of this patent is extended or adjusted under 35 U.S.C. 154(b) by 208 days.

(21) Appl. No.: 10/812,106

(22) Filed: Mar. 29, 2004

(65) Prior Publication Data

US 2005/0215438 A1 Sep. 29, 2005

(51) Int. Cl.
C09K 8/62 (2006.01)
C09K 8/80 (2006.01)

(52) U.S. Cl. .................. 507/219; 507/224; 507/225; 507/231; 526/287; 526/317.1; 526/335; 526/346; 526/348

(58) Field of Classification Search ............ None
See application file for complete search history.

(56) References Cited

U.S. PATENT DOCUMENTS

| | | | | |
|---|---|---|---|---|
| 4,448,926 A | | 5/1984 | Lundberg et al. ........... 524/612 |
| 4,745,160 A | | 5/1988 | Churchill et al. ........... 525/414 |
| 5,226,480 A | * | 7/1993 | Dovan et al. ............... 166/300 |
| 5,373,901 A | | 12/1994 | Norman et al. ............. 166/300 |
| 5,429,826 A | | 7/1995 | Nair et al. .................. 424/501 |
| 5,470,510 A | | 11/1995 | Willey et al. ............... 252/546 |
| 5,525,702 A | | 6/1996 | Nace ......................... 528/354 |
| 6,166,151 A | | 12/2000 | Hariharan et al. .......... 525/463 |
| 6,322,722 B1 | | 11/2001 | Bhattacharjee et al. 252/182.24 |
| 6,414,170 B1 | | 7/2002 | Kim et al. .................... 554/52 |
| 6,444,316 B1 | | 9/2002 | Reddy et al. ............... 428/407 |
| 6,451,346 B1 | | 9/2002 | Shah et al. .................. 424/486 |
| 6,469,132 B1 | | 10/2002 | Eisenberg et al. .......... 528/354 |
| 6,527,051 B1 | | 3/2003 | Reddy et al. ............... 166/300 |
| 6,541,033 B1 | | 4/2003 | Shah et al. .................. 424/486 |
| 6,554,071 B1 | | 4/2003 | Reddy et al. ............... 166/293 |
| 6,632,457 B1 | | 10/2003 | Sawhney ..................... 424/501 |
| 6,835,394 B1 | | 12/2004 | Discher et al. ............. 424/450 |
| 6,916,488 B1 | * | 7/2005 | Meier et al. ................ 424/450 |
| 2002/0161087 A1 | * | 10/2002 | Heitz et al. ................. 524/379 |
| 2002/0161134 A1 | | 10/2002 | Kim et al. .................... 525/408 |
| 2003/0060374 A1 | * | 3/2003 | Cooke, Jr. .................. 507/200 |
| 2003/0099709 A1 | | 5/2003 | Shah et al. .................. 424/469 |
| 2004/0010060 A1 | * | 1/2004 | Joanicot et al. ............ 523/201 |

FOREIGN PATENT DOCUMENTS

| | | |
|---|---|---|
| WO | WO 01/41735 A2 | 6/2001 |
| WO | WO 01/63090 A2 | 8/2001 |
| WO | WO 02/070861 A1 | 9/2002 |
| WO | WO 03/033592 A1 | 4/2003 |
| WO | WO 03/033593 A1 | 4/2003 |

OTHER PUBLICATIONS

"Polymer Vesicles;" Discher, D.E., Eisenberg, A.E.; Science, vol. 297; 967-973, Aug. 9, 2002.
"Hyperviscous Diblock Copolymer Vesicles;" Dimova, R.; Siefert, U.; Pouligny, B.; Forster, S.; Dobereiner, H.-G.; The European Physical Journal E, vol. 7, 241-250, 2002.
"Biodegradable Polymersomes;" Meng, F.; Hiemstra, C.; Engbers, G.; Feijen, J.; Macromolecules; vol. 36; 3004-3006, 2003.
"Micellization and Gelation of Aqueous Solutions of Star-Shaped PLLA-PEO Block Copolymers;" Park, S.Y.; Han, B.R.; Na, K.M.; Han, D.K.; Kim, S.C.; Macromolecules; vol. 36, 4115-4124, 2003.
Discher Dennis, et al.: "Preparation, Stability, and in vitro Performance of Vesicles Made With Deblock Copolymers," Database Accession No. E2001095477004, Oct. 2000.
Search Report and Written Opinion PCT/GB2005/001215, Mar. 29, 2005.

* cited by examiner

Primary Examiner—Marc S. Zimmer
(74) Attorney, Agent, or Firm—Robert A. Kent; Baker Botts

(57) ABSTRACT

The present invention relates to methods and compositions for treating subterranean formations. More particularly, the present invention relates to polymersomes, viscosifying agents that comprise polymersomes, and associated methods of use. In some embodiments, the present invention discloses methods of treating a section of a subterranean formation that comprises the steps of providing a viscosified treatment fluid that comprises an aqueous-based component, and a viscosifying agent that comprises a polymersome; and treating the section of the subterranean formation. In other embodiments, the present invention discloses methods of viscosifying a treatment fluid, suspending particulates in a treatment fluid, fracturing a subterranean formation, providing sand control in a section of a subterranean formation, and encapsulating treatment fluid additives. In yet other embodiments, the present invention discloses viscosified treatment fluids, fracturing fluids, gravel pack fluids, polymersomes, and encapsulated treatment fluid additives.

28 Claims, 3 Drawing Sheets

POLYMERSOME COMPOSITIONS AND ASSOCIATED METHODS OF USE

BACKGROUND OF THE INVENTION

The present invention relates to methods and compositions for treating subterranean formations. More particularly, the present invention relates to polymersomes, viscosifying agents that comprise polymersomes, and associated methods of use.

Viscosified treatment fluids may be used in a variety of operations and treatments performed in oil and gas wells. Such operations and treatments include, but are not limited to, drilling operations, production stimulation operations, and completion operations.

Drilling processes typically require the use of a drilling fluid. During drilling operations, the drilling fluid passes down through the inside of the drill string, exits through the drill bit, and returns to the drilling rig through the annulus between the drill string and well bore. The circulating drilling fluid, inter alia, lubricates the drill bit, carries drill cuttings to the surface, and balances the formation pressure exerted on the well bore. A drill-in fluid is a specially designed drilling fluid that is used for drilling into the production zone of a subterranean formation. Drilling fluids typically require sufficient viscosity to suspend drill cuttings.

Well stimulation treatments, such as fracturing treatments, commonly employ viscosified treatment fluids. Fracturing operations generally involve pumping a viscous fracturing fluid into a subterranean formation at a sufficient hydraulic pressure to create or enhance one or more cracks or "fractures" in the subterranean formation. The fracturing fluid generally has a viscosity sufficient to carry particulates (e.g., proppant) to at least one fracture, inter alia, to aid in maintaining the integrity of those fractures once the hydraulic pressure is released. Once at least one fracture is created and the proppant is substantially in place, the viscosity of the fracturing fluid usually is reduced, and the fluid is recovered from the formation.

Similarly, completion operations (e.g., gravel packing) also employ viscosified treatment fluids. Gravel packing operations typically use viscosified gravel pack fluids to suspend gravel particulates for delivery to a desired area in a well bore, e.g., near unconsolidated or weakly consolidated formation zones. One common type of gravel packing operation involves placing a gravel pack screen in the well bore and packing the annulus between the screen and the well bore with particulates (e.g., gravel) of a specific size designed to prevent the passage of formation sand. When installing the gravel pack, oftentimes the particulates are carried to the annulus behind the screen in the form of a slurry by mixing the gravel particulates with a viscosified treatment fluid. The particulates act, inter alia, to prevent the formation particulates from occluding the screen or migrating with the produced fluids, and the screen acts, inter alia, to prevent the particulates from entering the production tubing. Once the gravel pack is substantially in place, the viscosity of the gravel pack fluid often is reduced to allow it to be recovered.

Viscosified treatment fluids are used, inter alia, in drilling operations, fracturing operations, and gravel pack operations. To accomplish tasks such as those described above, having a treatment fluid with the appropriate rheological characteristics (e.g., viscosity, yield point, etc.) may be critical. In drilling operations, yield point of the drilling fluid may be an important characteristic. Yield point is used, inter alia, to determine the ability of a drilling fluid to carry drill cuttings out of the well bore, generally speaking, the higher a yield point the better the suspension capabilities of the drilling fluid. To obtain the desired yield points (as well as other flow properties), drilling fluids typically comprise complicated emulsions that comprise clays and other solids. But these emulsions often result in increased expense and complexity in the drilling operation.

Another important characteristic in the viscosified treatment fluids is viscosity. Among other reasons, the viscosified treatment fluids should have a viscosity sufficient to transport solids, such as particulates or drill cuttings. Furthermore, maintaining sufficient viscosity, also is important, in fracturing operations, to create or enhance fracture width. To modify the treatment fluids to obtain optimum properties, viscosifying agents commonly are added to treatment fluids, e.g., to provide fluid loss control and suspend particulates, such as proppant or gravel. Examples of commonly used viscosifying agents include, but are not limited to, guar gum, guar derivatives, hydroxyethyl cellulose, xanthan, starches, polyacrylamide, and other conventional viscosifying agents. The use of conventional viscosifying agents, however, may be problematic. For instance, these viscosifying agents may leave an undesirable chemical residue in the subterranean formation after use. As a result, potentially costly remedial operations may be required to clean up the well bore. Further, to minimize residual damage, foamed treatment fluids and emulsion-based treatment fluids have been employed, but increased expense and complexity often result.

SUMMARY OF THE INVENTION

The present invention relates to methods and compositions for treating subterranean formations. More particularly, the present invention relates to polymersomes, viscosifying agents that comprise polymersomes, and associated methods of use.

In some embodiments, the present invention provides a method of viscosifying a treatment fluid comprising the steps of providing a viscosifying agent that comprises a polymersome; and adding the viscosifying agent to the treatment fluid.

In another embodiment, the present invention provides a method of suspending particulates in a treatment fluid comprising the steps of providing a viscosifying agent that comprises a polymersome; adding the viscosifying agent to the treatment fluid; and adding particulates to the treatment fluid so that they are at least partially suspended therein.

In another embodiment, the present invention provides a method of treating a section of a subterranean formation comprising the steps of providing a viscosified treatment fluid that comprises an aqueous-based component, and a viscosifying agent that comprises a polymersome; and treating the section of the subterranean formation.

In another embodiment, the present invention provides a method of fracturing a subterranean formation comprising the steps of providing a fracturing fluid that comprises an aqueous-based component, and a viscosifying agent that comprises a polymersome; and placing the fracturing fluid into the subterranean formation at a pressure sufficient to create or enhance at least one fracture therein.

In another embodiment, the present invention provides a method of providing sand control in a section of a subterranean formation comprising the steps of providing a gravel pack fluid that comprises an aqueous-based component, a viscosifying agent that comprises a polymersome, and particulates; and introducing the gravel pack fluid to the section, such that the particulates form a gravel pack in or neighboring the section.

In another embodiment, the present invention provides a method of encapsulating a treatment fluid additive comprising the steps of providing block copolymers that comprise a hydrophilic block and a hydrophobic block; and preparing at least one polymersome comprising a hydrophilic core from the block copolymers in the presence of the treatment fluid additive, wherein the polymersome encapsulates at least a portion of the treatment fluid additive within the polymersome.

In yet another embodiment, the present invention provides a viscosified treatment fluid that comprises an aqueous-based component; and a viscosifying agent that comprises a polymersome.

In another embodiment, the present invention provides a fracturing fluid that comprises an aqueous-based component, and a viscosifying agent that comprises a polymersome.

In another embodiment, the present invention provides a gravel pack fluid that comprises an aqueous-based component; a viscosifying agent that comprises a polymersome; and particulates.

In another embodiment, the present invention provides a polymersome that comprises a block copolymer comprising poly(butadiene) and poly(acrylic acid).

In another embodiment, the present invention provides an encapsulated treatment fluid additive for use in a subterranean environment, the encapsulated treatment fluid additive comprising a treatment fluid additive encapsulated within a polymersome.

The features and advantages of the present invention will be readily apparent to those skilled in the art upon a reading of the description of the preferred embodiments that follows.

BRIEF DESCRIPTION OF THE DRAWINGS

A more complete understanding of the present disclosure and advantages thereof may be acquired by referring to the following description taken in conjunction with the accompanying drawings, wherein.

Figure 1:
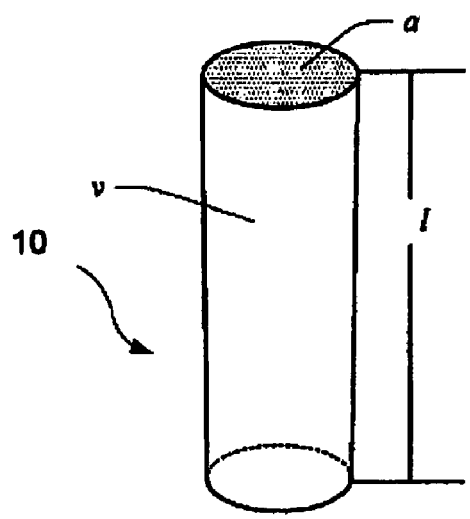
FIG. 1 illustrates the shape of an example of one embodiment of a block copolymer in accordance with an embodiment of the present invention. accordance with an embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit, or define, the invention to the particular forms disclosed, but on the contrary, the intention is to cover all modifications, equivalents, and alternatives falling within the spirit and scope of the invention as defined by the appended claims.

DESCRIPTION OF EXEMPLARY EMBODIMENTS

The present invention relates to methods and compositions for treating subterranean formations. More particularly, the present invention relates to polymersomes, viscosifying agents that comprise polymersomes, and associated methods of use. While the methods and compositions of the present invention may be useful in a variety of applications, they may be particularly useful in subterranean applications utilizing a viscosified treatment fluid, such as fracturing, gravel packing, and drilling.

The viscosified treatment fluids of the present invention generally comprise an aqueous-based component and a viscosifying agent that comprises polymersomes. As referred to herein, "polymersome" refers to polymer vesicles that comprise at least a bilayer membrane, wherein the polymersomes generally comprise hydrophobic and hydrophilic portions. A variety of additives suitable for use in the chosen operation or treatment may be included in the viscosified treatment fluids as desired.

The aqueous-based component of the viscosified treatment fluids of the present invention includes fresh water, salt water, brine (e.g., saturated salt water), or seawater. Generally, the water may be from any source provided that it does not contain components that may adversely affect other components in the viscosified treatment fluid.

Generally, the viscosifying agents of the present invention comprise polymersomes. In addition to providing the desired viscosity, the viscosifying agents that comprise polymersomes of the present invention, among other things, may act to provide fluid loss control and/or inhibit shale swelling in accordance with the methods and compositions of the present invention. In some embodiments, the viscosifying agents of the present invention may viscosify the treatment fluid therein. In yet other embodiments, the desired functionality of the viscosifying agents may be to provide any one or more of the above. To achieve at least some of the desired beneficial effects of the present invention, the polymersomes of the viscosifying agents of the present invention should be able to withstand the rigors of being pumped into a subterranean formation, and they should be resistant to temperatures and pressures that they will encounter during subterranean operations. In certain embodiments, the polymersomes can withstand temperatures of up to about 400°, and pressures of up to about 20,000 psi. Generally, the pumping rates encountered may range from low shear rate laminar flows to high turbulence. In certain embodiments, the polymersomes may withstand shear rates up to about 3,000 reciprocal seconds ($s^{-1}$). In certain embodiments, where the viscosified treatment fluids are used in drilling operations, the polymersomes should be able to withstand the rigors of being pumped and circulated through a drill bit.

The polymersomes generally comprise block copolymers that comprise a hydrophobic block and a hydrophilic block. These block copolymers may have a number average molecular weight in the range of from about 2,000 to about 100,000. In an exemplary embodiment of the present invention, the block copolymers may have a hydrophilic mass fraction in the range of from about 20% to about 45% by weight of the block copolymer. In an exemplary embodiment of the present invention, the block copolymers may have a hydrophobic mass fraction in the range of from about 55% to about 80% by weight of the block copolymer.

The hydrophilic block of the block copolymers may comprise any polymer for which water is a good solvent. Examples of suitable polymers for the hydrophilic block include, but are not limited to, poly(acrylic acid), poly(ethylene oxide), poly(methacrylic acid), poly(2-acrylamido, 2-methyl propane sulfonic acid), poly(acrylamide), and poly(2-dimethylaminoethyl methacrylate). Of these, poly(acrylic acid) is preferred.

The hydrophobic block may comprise any polymer for which water is not a good solvent. Examples of suitable hydrophobic polymers for the hydrophobic block include, but are not limited to, poly(butadiene), poly(styrene), poly (isoprene), poly(ethylene), poly(ethylene propylene), poly (ethylene butene), and any derivatives so long as the derivatives do not adversely affect other components in the viscosified treatment fluid. Of these, polybutadiene is preferred.

Sufficient amounts of the polymersomes should be included in the viscosified treatment fluids of the present invention, e.g., to provide the desired rheological properties based on the specific polymersome chosen and the particular subterranean operation or treatment. Among other things, as the concentration of the polymersomes in the viscosified treatment fluids of the present invention increases, the viscosity of such viscosified treatment fluids also should increase. In certain embodiments, this should provide improved particulate suspension capabilities for the viscosified treatment fluid. In comparison to conventional viscosifying agents, the viscosifying agents of the present invention should provide the appropriate viscosity for the viscosified treatment fluid while potentially using a smaller amount of the viscosifying agent relative to conventional viscosifying agents, thereby potentially reducing the cost of the operation (or treatment) and the need for costly remedial operations. In some exemplary embodiments, the viscosifying agent is present (or added) to the viscosified treatment fluids in an amount such that the polymersomes are included in the viscosified treatment fluids in the range of from about 0.01% to about 1.0% by weight of the viscosified treatment fluid.

The polymersomes of the present invention may be prepared from block copolymers by any process that produces suitable polymersomes for a particular application. Examples of suitable processes for preparation include, but are not limited to, film rehydration, electroformation, and solvent injection. Of these, solvent injection is preferred. Exemplary processes for preparation of polymersomes is described in the publication of Science, Vol. 297 entitled "Polymer Vesicles" by D. E. Discher and A. E. Eisenberg, the relevant disclosure of which is hereby incorporated by reference. One of ordinary skill in the art with the benefit of this disclosure will recognize the appropriate process to produce the polymersomes for a particular application.

The formation of a polymersome from block copolymers depends, inter alia, on a variety of factors associated with the selected block copolymers, including, but not limited to, the critical packing factor and the hydrophilic mass fraction. One factor that may be important in determining polymersome formation may be the hydrophilic mass fraction. As previously mentioned, the block copolymers of the present invention may have a hydrophilic mass fraction in the range of from about 20% to about 45% by weight of the block copolymer. Another factor that may be important in polymersome formation is the critical packing factor. The critical packing factor is an expression of the geometric packing properties of a block copolymer. The critical packing factor takes into account the hydrophobic volume of the block copolymer, hydrophobic chain length, and the hydrophilic head group cross-sectional area. FIG. 1 illustrates the shape of an exemplary block copolymer of the present invention generally represented by the numeral 10 and the associated geometrical factors. As shown in FIG. 1, v is the hydrophobic volume, l is the hydrophobic chain length, and a is the hydrophilic head group cross-sectional area. Generally, the critical packing factor is defined by the following equation:

$$\text{Critical Packing Factor} = \frac{v}{al}$$

In particular, if the formation of polymersomes from block copolymers follows similar rules to those between surfactant molecules and their self-assembled structures, one skilled in the art would expect a critical packing factor in the range of about 0.5 to about 1 to be important for polymersome formation. One of ordinary skill in the art with the benefit of this disclosure will be able to determine the appropriate packing factor necessary for polymersome formation.

The viscosified treatment fluids optionally may comprise particulates suitable for use in subterranean applications. Suitable particulates include, but are not limited to, gravel, natural sand, quartz sand, particulate garnet, glass, ground walnut hulls, nylon pellets, aluminum pellets, bauxite, ceramics, polymeric materials, combinations thereof, and the like. One having ordinary skill in the art, with the benefit of this disclosure, will recognize the particulate type, size, and amount to use in conjunction with the treatment fluids of the present invention to achieve a desired result. In certain exemplary embodiments, the particulates used may be included in the viscosified treatment fluids to form a gravel pack downhole or as a proppant in fracturing operations.

The pH of the viscosified treatment fluids of the present invention may be an important factor and may affect the viscosifying agent. Among other things, maintenance of an appropriate pH may be critical in maintaining the integrity of the polymersomes that are present in the viscosifying agent. For example, for polymersomes that comprise poly (butadiene-b-acrylic acid) block copolymers, the viscosified treatment fluids should have a pH of 5 or less in order to maintain the integrity of the polymersomes. However, for other polymersomes, other pHs may be suitable. For example, for polymersomes where the hydrophilic block comprises poly(ethylene oxide), the pH may be in the range of from about 3 to about 12. The appropriate pH of the viscosified treatment fluid may depend on the formation characteristics and conditions, the polymersome chosen, the desired application, and other factors known to those skilled in the art with the benefit of this disclosure.

The viscosified treatment fluids of the present invention optionally may comprise a buffer. The buffer may be included in the viscosified treatment fluids to maintain pH in a desired range, inter alia, for the viscosified treatment fluid or the stability of the polymersome. Examples of suitable buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, and the like. The buffer may be present in the viscosified treatment fluids of the present invention in an amount sufficient to maintain the pH of the treatment fluid at a desired level. One of ordinary skill in the art, with the benefit of this disclosure, will recognize the appropriate buffer and amount of buffer to use for a chosen application.

In some applications, after a treatment fluid has performed its desired function, its viscosity may be reduced. For example, in subterranean treatments and operations, once the treatment fluid's viscosity is reduced, it may be flowed back to the surface, and the well may be returned to production. In some embodiments, to reduce the viscosity of the viscosified treatment fluids of the present invention, the structural integrity of the polymersomes should be altered. This may be accomplished by a wide variety of means. For example, rupturing the membrane of the polymersomes may result in a reduction of the viscosified treatment fluid's viscosity by releasing fluid contained within the polymersome into the treatment fluid. In some embodiments, by raising the pH of the viscosified treatment fluid, charges may be put on the polymersome altering the cross-sectional area of the hydrophilic head group, which may cause the polymersome to rupture. In other embodiments, decreasing the pH of the viscosified treatment fluid may aid in rupturing the polymersomes, for example, where the hydrophilic block includes cationic groups.

In some embodiments, to facilitate reduction of the treatment fluid's viscosity, the pH of the viscosified treatment fluid may be raised at a chosen time, or after a desired time, by a variety means. For example, encapsulated pH-adjusting agents or base-releasing degradable materials that react over time in an aqueous environment to produce a base may be included in the treatment fluids. In certain exemplary embodiments, where the pH is to be increased, suitable pH-adjusting agents comprise a base, including but not limited to, sodium hydroxide, potassium hydroxide, lithium hydroxide, sodium carbonate, potassium carbonate, combinations thereof, and the like. In these embodiments, the pH-adjusting agents may be encapsulated using known encapsulation techniques. Exemplary encapsulation methodology is described in U.S. Pat. Nos. 5,373,901; 6,444,316; 6,527,051; and 6,554,071, the relevant disclosures of which are incorporated herein by reference. Base-releasing degradable materials also may be included in the viscosified treatment fluids to increase the pH of the viscosified treatment fluid. Suitable base-releasing degradable materials that may be used in conjunction with the present invention are those materials that are substantially water insoluble such that they degrade over time, rather than instantaneously, in an aqueous environment to produce a base. Examples of suitable base-releasing degradable materials include urea, ulexite, or blends thereof. Depending on the timing required for the reduction of viscosity, the base-releasing degradable material may provide a relatively fast break or a relatively slow break, depending on, for example, the particular base-releasing degradable material chosen. Materials suitable for use as a base-releasing degradable material of the present invention may be considered degradable if the degradation is due, inter alia, to chemical and/or radical processes, such as hydrolysis, oxidation, or enzymatic decomposition. The appropriate pH-adjusting agent or base-releasing material and amount thereof may depend upon the formation characteristics and conditions, the polymersome chosen, and other factors known to individuals skilled in the art with the benefit of this disclosure.

Furthermore, in some embodiments, to facilitate reduction of the treatment fluid's viscosity, the pH of the treatment fluid at a chosen time, or after a desired time, may be raised by a variety of means. For example, encapsulated pH-adjusting agents or base-releasing degradable materials that react over time in an aqueous environment to produce a base may be included in the treatment fluids. In certain exemplary embodiments, where the pH is to be decreased, suitable pH-adjusting agents include, but are not limited to, fumaric acid, formic acid, acetic acid, acetic anhydride, hydrochloric acid, hydrofluoric acid, hydroxyfluoboric acid, polyaspartic acid, polysuccinimide, combinations thereof, and the like. In these embodiments, the pH-adjusting agents may be encapsulated using known encapsulation techniques. Exemplary encapsulation methodology is described in U.S. Pat. Nos. 5,373,901; 6,444,316; 6,527,051; and 6,554,071, the relevant disclosures of which are incorporated herein by reference. Acid-releasing degradable materials also may be included in the viscosified treatment fluids to decrease the pH of the viscosified treatment fluid. Suitable acid-releasing degradable materials that may be used in conjunction with the present invention are those materials that are substantially water insoluble such that they degrade over time, rather than instantaneously, in an aqueous environment to produce an acid. Examples of suitable acid-releasing degradable materials include orthoesters; poly(ortho esters); lactides; poly(lactides); glycolides; poly(glycolides); substituted lactides wherein the substituted group comprises hydrogen, alkyl, aryl, alkylaryl, acetyl heteroatoms and mixtures thereof; substantially water insoluble anhydrides; and poly(anhydrides). Depending on the timing required for the reduction of viscosity, the acid-releasing degradable material may provide a relatively fast break or a relatively slow break, depending on, for example, the particular acid-releasing degradable material chosen. Materials suitable for use as an acid-releasing degradable material of the present invention may be considered degradable if the degradation is due, inter alia, to chemical and/or radical processes, such as hydrolysis, oxidation, or enzymatic decomposition. The appropriate pH-adjusting agent or acid-releasing material and amount thereof may depend upon the formation characteristics and conditions, the polymersome chosen, and other factors known to individuals skilled in the art with the benefit of this disclosure.

Additional additives may be added to the viscosified treatment fluids of the present invention as deemed appropriate for a particular application by one skilled in the art with the benefit of this disclosure. Examples of such additives include, but are not limited to, weighting agents, surfactants, scale inhibitors, antifoaming agents, foaming agents, fluid loss control additives, conventional viscosifying agents, gel breakers, shale swelling inhibitors, combinations thereof, and numerous other additives suitable for use in subterranean operations. For example, in certain embodiments, it may be desirable to include a conventional viscosifying agent, such as a guar gum, inter alia, to achieve possible synergistic properties with the viscosifying agents of the present invention, for example, where the viscosifying agent of the present invention is included in the viscosified treatment fluid primarily to provide fluid loss control.

The viscosified treatment fluids of the present invention may be utilized for carrying out a variety of subterranean well treatments and operations, including, but not limited to, drilling operations, fracturing treatments, and completion operations (e.g., gravel packing treatments). In some embodiments, where the treatment fluids of the present invention are used with fracturing operations, fracturing fluids that comprise an aqueous-based component, and a viscosifying agent that comprises polymersomes may be placed into a subterranean formation at a pressure sufficient to create or enhance one or more fractures therein. At a chosen time, or after a desired time, the viscosity of the fracturing fluid may be reduced and the fracturing fluid recovered.

In other embodiments, wherein the viscosified treatment fluids of the present invention are used with gravel packing operations, gravel pack fluids that comprise an aqueous-based component, a viscosifying agent that comprises polymersomes, and particulates may be introduced into a well bore so as to create a gravel pack. At a chosen time, the viscosity of the gravel pack fluid may be reduced to a desired degree.

In other embodiments of the present invention, the polymersomes may be used in encapsulating methodologies that may be used to encapsulate treatment fluid additives for use in subterranean environments. For example, if the polymersomes are formed in the presence of the desired treatment fluid additive, the polymersomes may capture the treatment fluid additive within the polymersome and encapsulate at least a portion of it. According to these methods of the present invention, a wide variety of materials may be encapsulated dependent upon the particular application. Where used in subterranean treatments and operations, the polymersomes may be formed in the presence of a variety of treatment fluid additives where encapsulation is desired. Such treatment fluid additives include, but are not limited to, gel breakers, emulsion breakers, scale inhibitors, emulsion inhibitors, gas hydrate inhibitors, paraffin inhibitors, corrosion inhibitors, and other materials known by those skilled in the art with the benefit of this disclosure.

In some embodiments, the present invention provides a method of viscosifying a treatment fluid comprising the steps of providing a viscosifying agent that comprises a polymersome; and adding the viscosifying agent to the treatment fluid.

In another embodiment, the present invention provides a method of suspending particulates in a treatment fluid comprising the steps of providing a viscosifying agent that comprises a polymersome; adding the viscosifying agent to the treatment fluid; and adding particulates to the treatment fluid so that they are at least partially suspended therein.

In another embodiment, the present invention provides a method of treating a section of a subterranean formation comprising the steps of providing a viscosified treatment fluid that comprises an aqueous-based component, and a viscosifying agent that comprises a polymersome; and treating the section of the subterranean formation.

In another embodiment, the present invention provides a method of fracturing a subterranean formation comprising the steps of providing a fracturing fluid that comprises an aqueous-based component, and a viscosifying agent that comprises a polymersome; and placing the fracturing fluid into the subterranean formation at a pressure sufficient to create or enhance at least one fracture therein.

In another embodiment, the present invention provides a method of providing sand control in a section of a subterranean formation comprising the steps of providing a gravel pack fluid that comprises an aqueous-based component, a viscosifying agent that comprises a polymersome, and particulates; and introducing the gravel pack fluid to the section, such that the particulates form a gravel pack in or neighboring the section.

In another embodiment, the present invention provides a method of encapsulating a treatment fluid additive comprising the steps of providing block copolymers that comprise a hydrophilic block and a hydrophobic block; and preparing at least one polymersome comprising a hydrophilic core from the block copolymers in the presence of the treatment fluid additive, wherein the polymersome encapsulates at least a portion of the treatment fluid additive within the polymersome.

In yet another embodiment, the present invention provides a viscosified treatment fluid that comprises an aqueous-based component; and a viscosifying agent that comprises a polymersome.

In another embodiment, the present invention provides a fracturing fluid that comprises an aqueous-based component, and a viscosifying agent that comprises a polymersome.

In another embodiment, the present invention provides a gravel pack fluid that comprises an aqueous-based component; a viscosifying agent that comprises a polymersome; and particulates.

In another embodiment, the present invention provides a polymersome that comprises a block copolymer comprising poly(butadiene) and poly(acrylic acid).

In another embodiment, the present invention provides an encapsulated treatment fluid additive for use in a subterranean environment, the encapsulated treatment fluid additive comprising a treatment fluid additive encapsulated within a polymersome.

To facilitate a better understanding of the present invention, the following examples of the preferred embodiments are given. In no way should the following examples be read to limit, or define, the scope of the invention.

EXAMPLES

Example 1

In the following example, polymersomes were formed using the solvent injection method of preparation. First, a sample solution of poly(butadiene-b-acrylic acid) block copolymer in chloroform was prepared, wherein the block copolymer had a hydrophilic mass fraction of 30% and a molecular weight of 8,000. Depending on the application, the block copolymer concentrations in the sample solution vary between 4 to 100 mg/ml.

To make polymersomes, the sample solution was injected into deionized water under high shear using a homogenizer (Tekmar Tissumizer) at 20% output for 10 minutes to form a homogenized sample solution. Alternatively, homogenization also may be carried out using a bench-top vortex mixer. Depending on the concentration of the sample solution, the homogenized sample solution may be either clear or opaque. For example, when 0.8 ml of 20 mg/ml sample solution is injected into 5.35 ml deionized water, a turbid solution was observed. On the other hand, when 55 µl of a 20 mg/ml sample solution was injected into 6 ml deionized water, a clear solution is obtained. Next, the homogenized sample solution was transferred into dialysis bags (Spectra/Por membrane, MWCO 3500) and dialyzed for several days against deionized water in a 3.5-liter flask while changing the water several times a day to form a vesicle solution. After dialysis, the resulting vesicle solutions were analyzed using a Brookhaven Instruments 200-SM goniometer for dynamic light scattering ("DLS"), and a Nikon TE300 inverted stage microscope with epifluorescence filter cube for light microscopy ("LM") and fluorescent microscopy ("FM"). For visualization of polymersomes in the vesicle solution using FM, hydrophobic DiO (Dioctadecyloxacarbocyanine perchlorate) was added to the vesicle solution. Edge bright images were observed with fluorescent microscopy, which generally is accepted evidence of vesicle formation.

Furthermore, the polymersomes present in the vesicle solution were investigated by negative staining of the polymersomes using a LEO/Zeiss 910, a 100 KeV Transmission Electron Microscope ("TEM"). A drop of the vesicle solution was placed on 200 mesh copper grids coated with formvar and stabilized with carbon film. After 10 minutes, the drop was removed from the grid, and the grid placed on a drop of 2% phosphotungstic acid ("PTA") for 10 minutes. After staining, the grids were rinsed with deionized water to remove excess stain. Next, the grids were wicked and allowed to dry at room temperature before analyzing. TEM analysis of the PTA stained samples showed dark halos, which generally are characteristic of polymersomes.

To determine the membrane thickness of the polymersomes, a vesicle solution prepared as described above was fixed using 2% osmium tetroxide, instead of PTA. The osmium tetroxide acts as both a stain and a fixing agent for the polymersome. Membrane thickness was found to be between about 14 to about 20 nm.

Example 1 indicates, inter alia, that poly(butadiene-b-acrylic acid) block copolymers may be used to prepare polymersomes of the present invention at least by solvent injection.

Example 2

Upon observation, the polymersomes present in the vesicle solution prepared in Example 1 showed gravitational settling to form sediment in the vesicle solution. The rheological properties of the sediment that includes polymersomes were investigated using a Rheometrics dynamic stress rheometer ("DSR").

Figure 2:
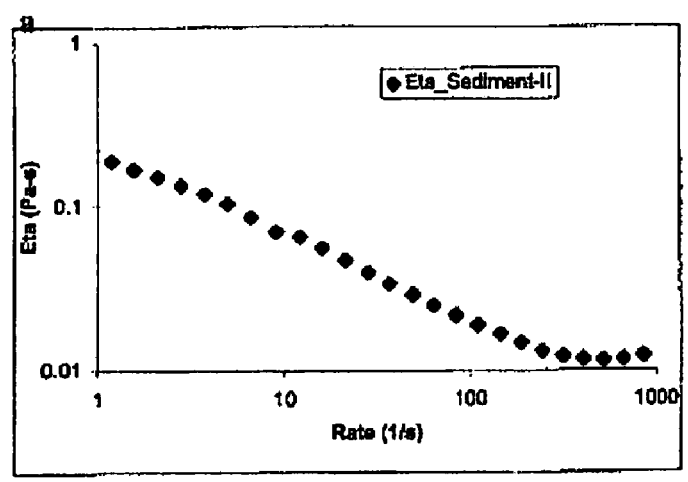
FIG. 2 is a graphical representation of a steady shear viscosity-shear rate curve for certain embodiments of a solution that comprises polymersomes.
Figure 3:
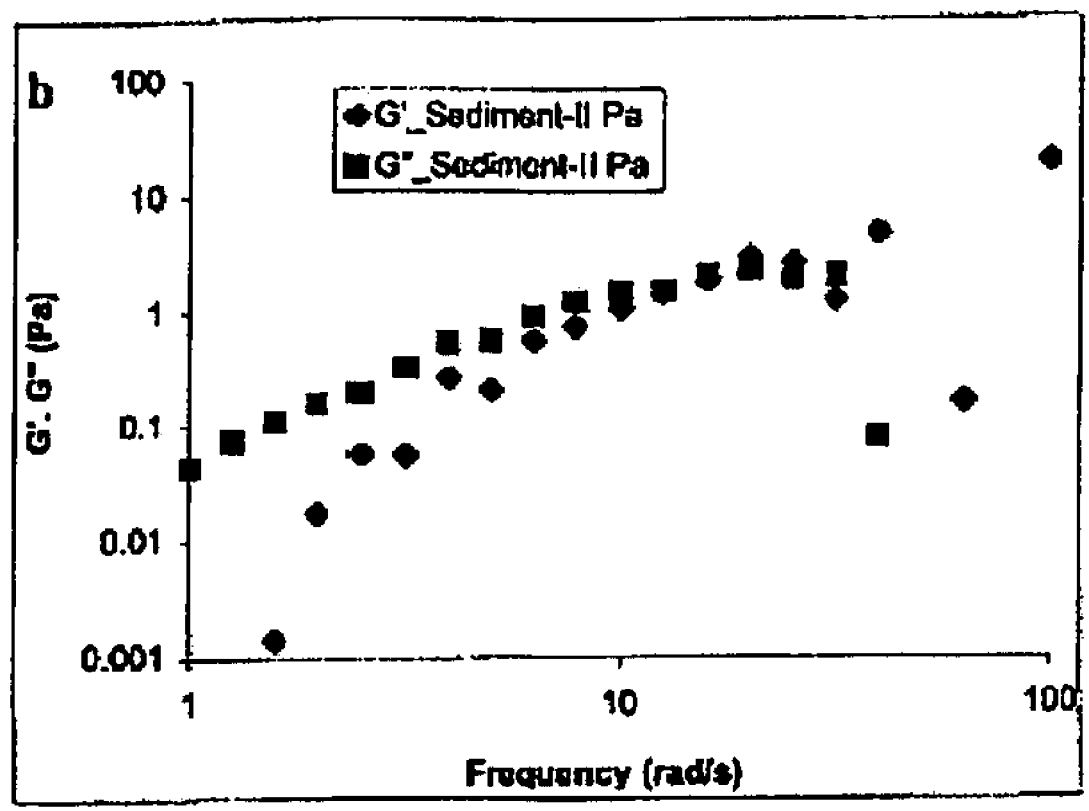
FIG. 3 is a graphical representation of a storage modulus-frequency curve and loss modulus-frequency curve for certain embodiments of a solution that comprises polymersomes.
Figure 4:
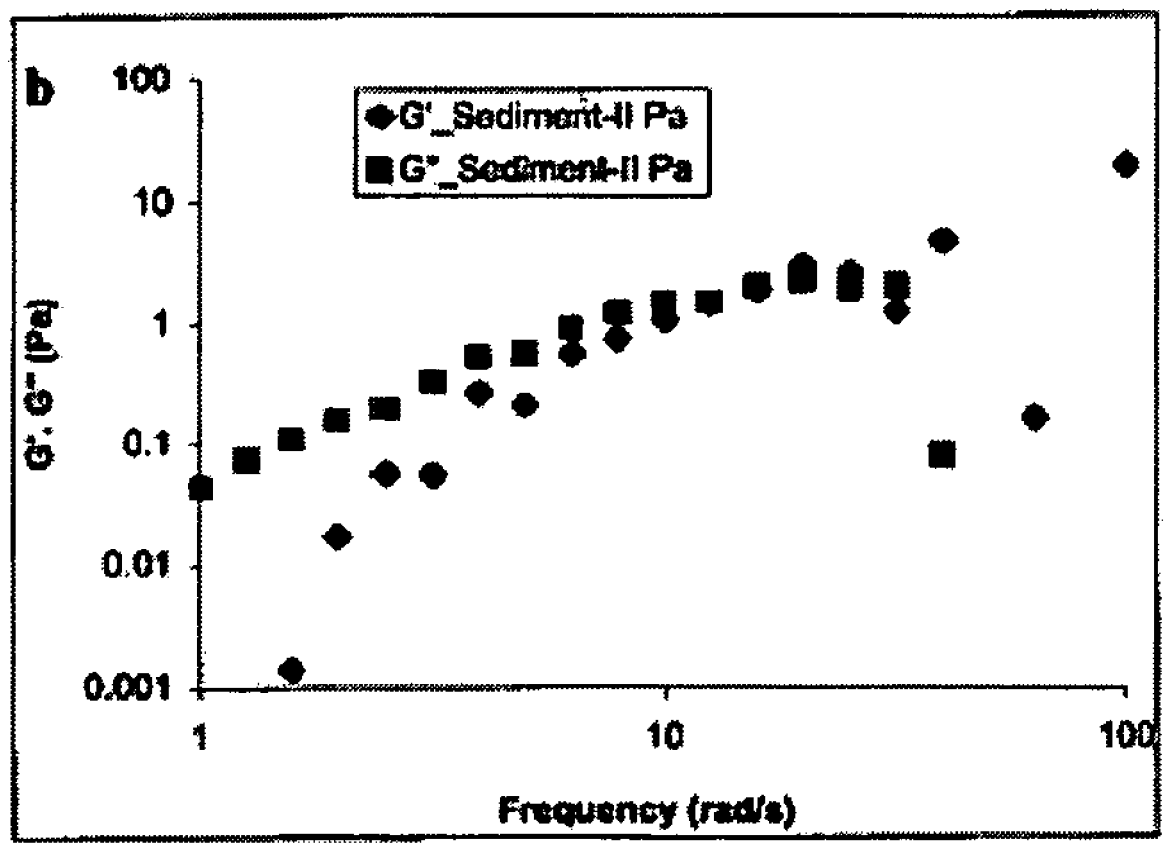

First, to determine the desired rheological properties of the polymersomes, the sediment in the vesicle solution was collected with a micropipette and transferred to the DSR. Using the DSR, dynamic and steady state properties of the sediment were determined. To study the behavior of the sediment under steady shear, steady rate sweeps were performed that covered shear rates between 0.7 and 1000 $s^{-1}$. Results of the rate sweeps indicated that the sediment showed shear thinning behavior. Dynamic properties were used to separate storage modulus (G') and loss modulus (C") of the sediment to obtain information about elastic and viscous behavior of the vesicle solution. A frequency sweep was carried out between 100 and 1 rad/second to investigate the dynamic rheological properties of the sediment. FIG. 2 graphically depicts the steady shear viscosity eta (Pa-s) as a function of shear rate ($s^{31\ 1}$) of the vesicle solution. FIG. 3 graphically depicts G' (Pa) and G"(Pa) as a function of frequency (rad/sec).

The polymer concentration of the sediment was determined using thermogravametric analysis ("TGA"). A 20 μl sample of the vesicle solution was placed on a TGA pan, and the moisture was removed. The polymer concentration was determined to be 28.5% by weight of the sample.

Therefore, Example 2 illustrates, inter alia, that the polymersomes formed from at least the solvent injection process of polymersome formation exhibit desirable rheological properties.

Example 3

To investigate the morphology of the vesicle solution, as well as the efficiency of the solvent injection method, in terms of the amount of polymer converted to polymersomes, experiments were carried out, as described below, using a Philips XL30 high-resolution field-emission Scanning Electron Microscope ("SEM") and a Transmission Electron Microscope ("TEM").

First, a SEM experiment was carried out. A drop of the vesicle solution was placed on double-sided tape on a SEM sample mount. The drop was allowed to dry at room temperature for several hours. After drying, the SEM sample mount was placed in a VCR IBS/TM 200S Ion Beam Sputterer ("IBS"), and the surface of the dried drop of the vesicle solution was coated with 10–20 nm of Au. This sample was then analyzed with the SEM. SEM results indicated a very high conversion to polymersomes, and, therefore, a high yield of vesicular formation.

For the TEM experiments, the vesicle solution was fixed using 2% osmium tetroxide as discussed above in Example 1. The fixed vesicle solution was centrifuged at 14,000 rpm for 45 minutes to form a pellet using an Eppendorf Centrifuge 5415 C. The pellet was then transferred into pure deionized water for 10 minutes. To replace the water with ethanol, the external environment was replaced with increasing concentrations of ethanol, starting with 50% followed by 70%, 80%, 95%, and finally pure ethanol for 10 minutes at each step. Finally, the pellet was embedded in Micro-Bed Resin (Electron Microscopy Sciences, PA). The pellet was infiltrated with 100% resin, 3 changes, 40 minutes each at room temperature, followed by a second infiltration with fresh resin overnight. Finally, the pellet was placed in embedding capsules filled with fresh resin and cured at about 50 to about 60° C. for about 24 to about 48 hours. Thin section (0.5 microns) are sectioned from the cured resin using a Leica Ultracut UCT Microtom with a glass knife. Sections were collected with 200 mesh copper grids and analyzed with TEM.

Therefore, Example 3 illustrates, inter alia, that the solvent injection process of polymersome formation exhibits a high conversion of the block copolymers to polymersomes.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A viscosified subterranean treatment fluid that comprises:
   an aqueous-based component;
   a encapsulate pH-adjusting agent, a base-releasing material, or an acid-releasing material; and
   a viscosifying agent that comprises a polymersome.

2. The viscosified treatment fluid of claim 1 wherein the polymersome comprises a block copolymer that comprises a hydrophilic block and a hydrophobic block.

3. The viscosified treatment fluid of claim 2 wherein the block copolymer has a hydrophilic mass fraction in the range of from about 20% to about 45% by weight of the block copolymer.

4. The viscosified treatment fluid of claim 2 wherein the hydrophilic block comprises poly(acrylic acid), poly(ethylene oxide), poly(methacrylic acid), poly(2-acrylamido, 2-methyl propane sulfonic acid), poly(2-dimethylaminoethyl methacrylate), or poly(acrylamide).

5. The viscosified treatment fluid of claim 2 wherein the hydrophobic block comprises poly(butadiene), poly(styrene), poly(isoprene), poly(ethylene), poly(ethylene propylene), or poly(ethylene butene).

6. The viscosified treatment fluid of claim 1 wherein the viscosifying agent is added to the viscosified treatment fluid in an amount such that the polymersome is included in the viscosified treatment fluid in an amount in the range of from about 0.01% to about 1.0% by weight of the viscosified treatment fluid.

7. The viscosified treatment fluid of claim 1 wherein the viscosified treatment fluid is a drilling fluid, a drill-in fluid, a fracturing fluid, or a gravel pack fluid.

8. The viscosified treatment fluid of claim 1 wherein viscosified treatment fluid further comprises particulates.

9. The viscosified treatment fluid of claim 1 wherein the viscosified treatment fluid further comprises a buffer.

10. The viscosified treatment fluid of claim 1 wherein the acid-releasing material comprises an orthoester; a poly(ortho ester), a lactide; a poly(lactide); a glycolide; a poly(glycolide); a substituted lactide; a substantially water insoluble anhydride; or a poly(anhydride).

11. The viscosified treatment fluid of claim 1 wherein the base-releasing material comprises urea, ulexite, or a blend thereof.

12. The viscosified treatment fluid of claim 1 wherein the pH-adjusting agent comprises sodium hydroxide, potassium hydroxide, lithium hydroxide, sodium carbonate, potassium carbonate, fumaric acid, formic acid, acetic acid, acetic anhydride, hydrochloric acid, hydrofluoric acid, hydroxyfluoboric acid, polyaspartic acid, or polysuccinimide.

13. A fracturing fluid that comprises:
an aqueous-based component;
a encapsulate PH-adjusting agent, a base-releasing material, or an acid-releasing material; and
a viscosifying agent that comprises a polymersome.

14. The fracturing fluid of claim 13 wherein the polymersome comprises a block copolymer that comprises a hydrophilic block and a hydrophobic block.

15. The fracturing fluid of claim 14 wherein the block copolymer has a hydrophilic mass fraction in the range of from about 20% to about 45% by weight of the block copolymer.

16. The fracturing fluid of claim 14 wherein the hydrophilic block comprises poly(acrylic acid), poly(ethylene oxide), poly(methacrylic acid), poly(2-acrylamido, 2-methyl propane sulfonic acid), poly(2-dimethylaminoethyl methacrylate), or poly(acrylamide).

17. The fracturing fluid of claim 14 wherein the hydrophobic block comprises poly(butadiene), poly(styrene), poly(isoprene), poly(ethylene), poly(ethylene propylene), or poly(ethylene butene).

18. The fracturing fluid of claim 13 wherein the viscosifying agent is added to the fracturing fluid in an amount such that the polymersome is included in the fracturing fluid in an amount in the range of from about 0.01% to about 1.0% by weight of the fracturing fluid.

19. The fracturing fluid of claim 13 wherein the fracturing fluid further comprises particulates.

20. The fracturing fluid of claim 13 wherein the fracturing fluid further comprises a buffer.

21. A gravel pack fluid that comprises:
an aqueous-based component,
a viscosifying agent that comprises a polymersome, an encapsulated pH adjusting agent, base-releasing material, or acid-releasing material, and
particulates suitable for forming a gravel pack.

22. The gravel pack fluid of claim 21 wherein the polymersome comprises a block copolymer that comprises a hydrophilic block and a hydrophobic block.

23. The gravel pack fluid of claim 22 wherein the block copolymer has a hydrophilic mass fraction in the range of from about 20% to about 45% by weight of the block copolymer.

24. The gravel pack fluid of claim 22 wherein the hydrophilic block comprises poly(acrylic acid), poly(ethylene oxide), poly(methacrylic acid), poly(2-acrylamido, 2-methyl propane sulfonic acid), poly(2-dimethylaminoethyl methacrylate), or poly(acrylamide).

25. The gravel pack fluid of claim 22 wherein the hydrophobic block comprises poly(butadiene), poly(styrene), poly(isoprene), poly(ethylene), poly(ethylene propylene), or poly(ethylene butene).

26. The gravel pack fluid of claim 21 wherein the viscosifying agent is added to the gravel pack fluid in an amount such that the polymersome is included in the gravel pack fluid in an amount in the range of from about 0.01% to about 1.0% by weight of the gravel pack fluid.

27. The gravel pack fluid of claim 21 wherein the particulates comprise gravel.

28. The gravel pack fluid of claim 21 wherein the gravel pack fluid further comprises a buffer.

* * * * *